United States Patent
Alvarez, Jr. et al.

(10) Patent No.: US 9,545,585 B2
(45) Date of Patent: Jan. 17, 2017

(54) METHOD, SYSTEM, AND DEVICE FOR DELIVERY OF HIGH PURITY HYDROGEN PEROXIDE

(71) Applicant: RASIRC, Inc., San Diego, CA (US)

(72) Inventors: Daniel Alvarez, Jr., Oceanside, CA (US); Edward Heinlein, San Diego, CA (US); Russell J. Holmes, San Diego, CA (US); Jeffrey J. Spiegelman, San Diego, CA (US)

(73) Assignee: RASIRC, Inc., San Diego, CA (US)

( * ) Notice: Subject to any disclaimer, the term of this patent is extended or adjusted under 35 U.S.C. 154(b) by 0 days.

(21) Appl. No.: 14/415,035

(22) PCT Filed: Mar. 14, 2013

(86) PCT No.: PCT/US2013/031501
§ 371 (c)(1),
(2) Date: Jan. 15, 2015

(87) PCT Pub. No.: WO2014/014511
PCT Pub. Date: Jan. 23, 2014

(65) Prior Publication Data
US 2015/0190736 A1  Jul. 9, 2015

Related U.S. Application Data

(60) Provisional application No. 61/672,263, filed on Jul. 16, 2012.

(51) Int. Cl.
*B01D 19/00* (2006.01)
*C01B 15/017* (2006.01)

(52) U.S. Cl.
CPC ....... *B01D 19/0073* (2013.01); *B01D 19/0031* (2013.01); *B01D 19/0068* (2013.01); *C01B 15/017* (2013.01)

(58) Field of Classification Search
CPC ............ B01D 19/0031; B01D 19/0068; B01D 19/0073; B01D 53/22; B01D 2256/00; B01D 2257/00; A61L 2/186; A61L 2/208; C01B 15/017
(Continued)

(56) References Cited

U.S. PATENT DOCUMENTS 3,557,009 A    1/1971   McCloskey et al.
4,488,951 A *  12/1984  Nolan ................. C01B 13/0214
                                                       204/265

(Continued)

OTHER PUBLICATIONS

Schumb, Walter C. et al. "Hydrogen Peroxide" Publishing Corporation, 1955, New York, NY http://hdl.handle.net/2027/mdp.39015003708784.

(Continued)

*Primary Examiner* — Jason M Greene
(74) *Attorney, Agent, or Firm* — Pierce Atwood LLP; Kevin M. Farrell; Daniel A. Lev

(57) ABSTRACT

A method and chemical delivery system are provided. The method includes providing a non-aqueous hydrogen peroxide solution having a vapor phase separated from the substantially non-aqueous hydrogen peroxide solution by a membrane. The method further includes contacting a carrier gas or vacuum with the vapor phase and delivering a gas stream comprising hydrogen peroxide to a critical process or application. The chemical delivery system includes a non-aqueous hydrogen peroxide solution having a vapor phase separated from the substantially non-aqueous hydrogen peroxide solution by a membrane. The system further includes a carrier gas or vacuum in fluid contact with the vapor phase and an apparatus for delivering a gas stream comprising at least one component of the hydrogen peroxide solution to a critical process or application.

24 Claims, 10 Drawing Sheets

(58) Field of Classification Search
USPC .................................................. 95/46; 96/6
See application file for complete search history.

(56) References Cited

U.S. PATENT DOCUMENTS

| | | | | |
|---|---|---|---|---|
| 4,826,681 | A | 5/1989 | Jacquet et al. | |
| 5,178,841 | A * | 1/1993 | Vokins | B65B 55/10 422/28 |
| 5,662,878 | A * | 9/1997 | Datta | C01B 15/023 210/640 |
| 5,667,753 | A * | 9/1997 | Jacobs | A61L 2/208 422/22 |
| 5,698,011 | A * | 12/1997 | Chung | B01D 53/22 95/45 |
| 7,399,344 | B1 * | 7/2008 | Li | B01D 63/02 210/650 |
| 2002/0022246 | A1 * | 2/2002 | Lin | A61L 2/208 436/1 |
| 2004/0062693 | A1 * | 4/2004 | Lin | A61L 2/208 422/297 |
| 2005/0252856 | A1 * | 11/2005 | Parrish | C01B 15/013 210/640 |
| 2009/0014901 | A1 * | 1/2009 | Spiegelman | B01B 1/005 261/128 |
| 2009/0145847 | A1 | 6/2009 | Spiegelman et al. | |
| 2009/0169630 | A1 * | 7/2009 | Ward | A61L 2/186 424/489 |
| 2009/0263499 | A1 * | 10/2009 | Platt, Jr. | A61L 2/202 424/616 |

OTHER PUBLICATIONS

International Search Report and Written Opinion of the International Searching Authority dated May 23, 2013 from international parent application No. PCT/US2013/031501, filed on Mar. 14, 2013.

* cited by examiner

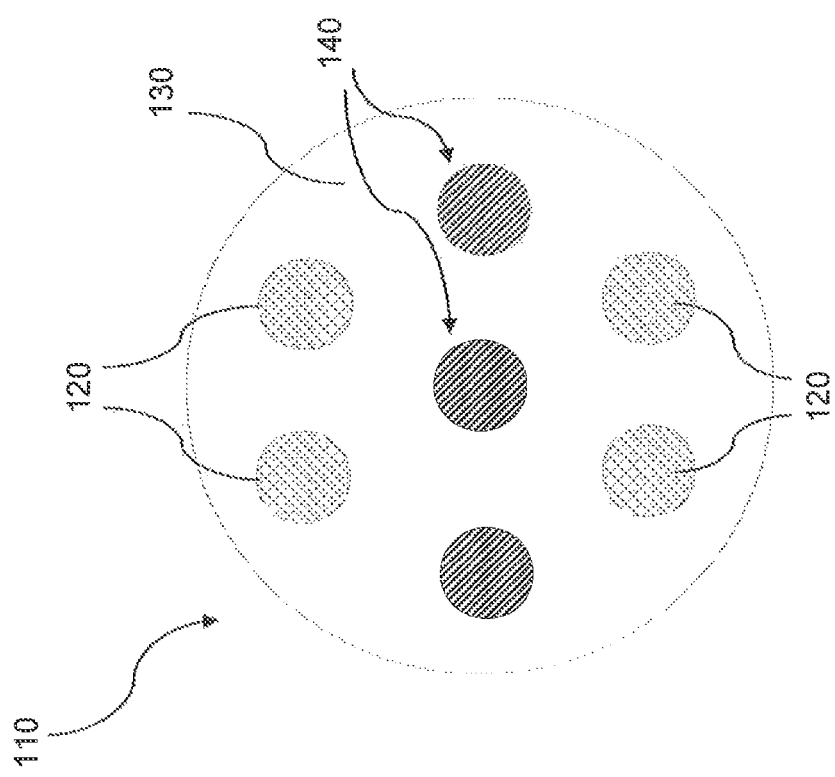

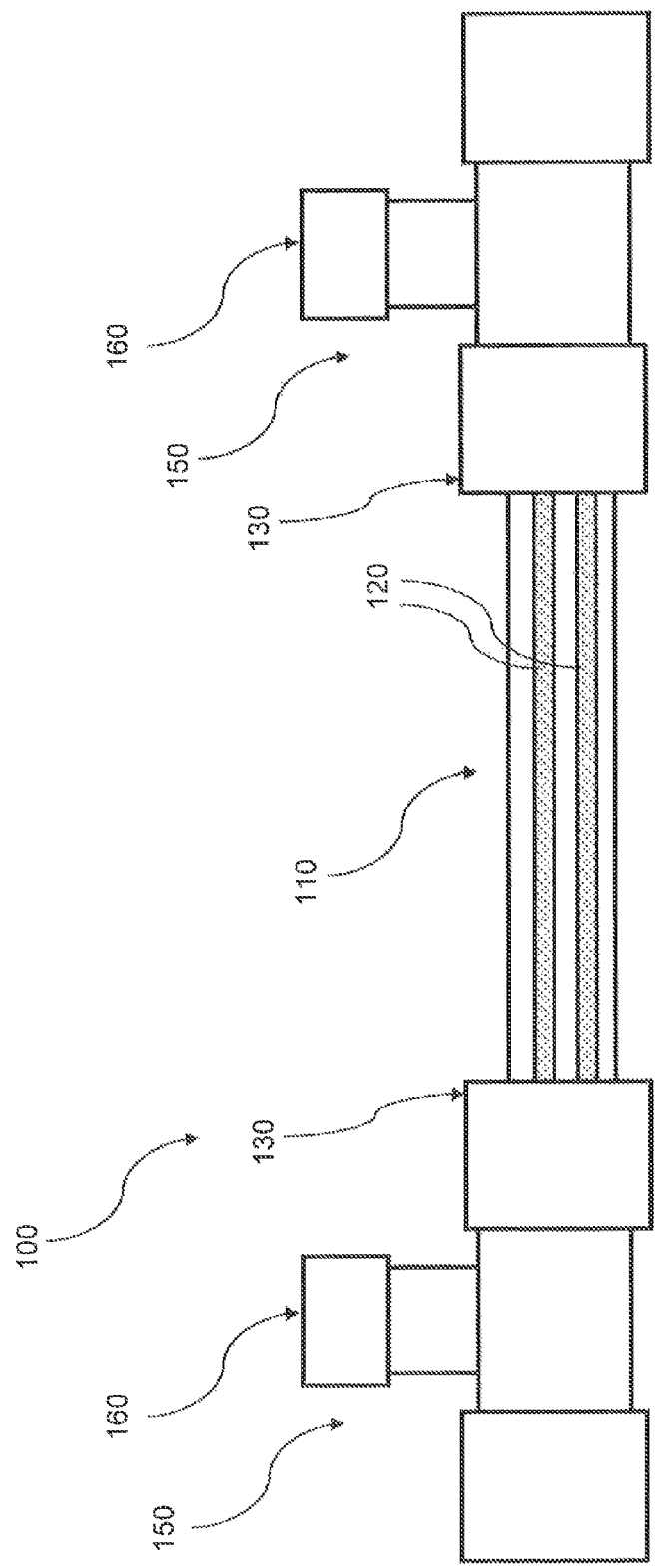

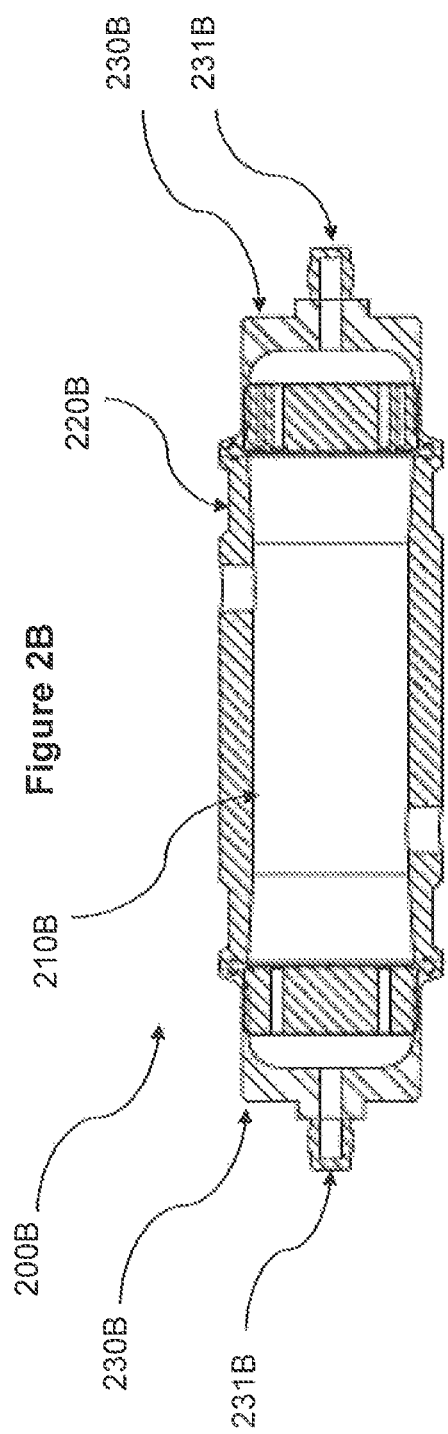

US 9,545,585 B2

METHOD, SYSTEM, AND DEVICE FOR DELIVERY OF HIGH PURITY HYDROGEN PEROXIDE

TECHNICAL FIELD

Methods, systems, and devices for the vapor phase delivery of high purity hydrogen peroxide in micro-electronics and other critical process applications.

BACKGROUND

Various process gases may be used in the manufacturing and processing of micro-electronics. In addition, a variety of chemicals may be used in other environments demanding high purity gases, e.g., critical processes, including without limitation microelectronics applications, wafer cleaning, wafer bonding, photolithography mask cleaning, atomic layer deposition, chemical vapor deposition, flat panel displays, disinfection of surfaces contaminated with bacteria, viruses and other biological agents, industrial parts cleaning, pharmaceutical manufacturing, production of nano-materials, power generation and control devices, fuel cells, power transmission devices, and other applications in which process control and purity are critical considerations. In those processes, it is necessary to deliver specific amounts of certain process gases under controlled operating conditions, e.g., temperature, pressure, and flow rate.

For a variety of reasons, gas phase delivery of process chemicals is preferred to liquid phase delivery. For applications requiring low mass flow for process chemicals, liquid delivery of process chemicals is not accurate or clean enough. Gaseous delivery would be desired from a standpoint of ease of delivery, accuracy and purity. One approach is to vaporize the process chemical component directly at or near the point of use. Vaporizing liquids provides a process that leaves heavy contaminants behind, thus purifying the process chemical. Gas flow devices are better attuned to precise control than liquid delivery devices. Additionally, micro-electronics applications and other critical processes typically have extensive gas handling systems that make gaseous delivery considerably easier than liquid delivery. However, for safety, handling, stability, and/or purity reasons, many process gases are not amenable to direct vaporization.

There are numerous process gases used in micro-electronics applications and other critical processes. Ozone is a gas that is typically used to clean the surface of semiconductors (e.g., photoresist stripping) and as an oxidizing agent (e.g., forming oxide or hydroxide layers). One advantage of using ozone gas in micro-electronics applications and other critical processes, as opposed to prior liquid-based approaches, is that gases are able to access high aspect ratio features on a surface. For example, according to the International Technology Roadmap for Semiconductors (ITRS), current semiconductor processes should be compatible with a half-pitch as small as 20-22 nm. The next technology node for semiconductors is expected to have a half-pitch of 14-16 nm, and the ITRS calls for <10 nm half-pitch in the near future. At these dimensions, liquid-based chemical processing is not feasible, because the surface tension of the process liquid prevents it from accessing the bottom of deep holes or channels and the corners of high aspect ratio features. Therefore, ozone gas has been used in some instances to overcome certain limitations of liquid-based processes, because gases do not suffer from the same surface tension limitations. Plasma-based processes have also been employed to overcome certain limitations of liquid-based processes. However, ozone- and plasma-based processes present their own set of limitations, including, inter alia, cost of operation, insufficient process controls, undesired side reactions, and inefficient cleaning.

More recently, hydrogen peroxide has been explored as a replacement for ozone in certain applications. However, hydrogen peroxide has been of limited utility, because highly concentrated hydrogen peroxide solutions present serious safety and handling concerns and obtaining high concentrations of hydrogen peroxide in the gas phase has not been possible using existing technology. Hydrogen peroxide is typically available as an aqueous solution. Thus, purifying an aqueous solution to achieve substantially water-free hydrogen peroxide is a challenge. It would be advantageous to be able to store hydrogen peroxide in dilute (e.g., 30%) non-aqueous solutions for practical purposes, and purify the solution to prepare high purity water-free peroxide when needed. In addition, because hydrogen peroxide has a relatively low vapor pressure (boiling point is approximately 150° C.), available methods and devices for delivering hydrogen peroxide generally do not provide hydrogen peroxide containing gas streams with a sufficient concentration of hydrogen peroxide. For vapor pressure and vapor composition studies of various hydrogen peroxide solutions, see, e.g., *Hydrogen Peroxide*, Walter C Schumb, Charles N. Satterfield and Ralph L. Wentworth, Reinhold Publishing Corporation, 1955, New York, available at http://hdl.handle.net/2027/mdp.39015003708784. Moreover, studies show that delivery into vacuum leads to even lower concentrations of hydrogen peroxide (see, e.g., *Hydrogen Peroxide*, Schumb, pp. 228-229). The vapor composition of a 30% $H_2O_2$ aqueous solution delivered using a vacuum at 30 mm Hg is predicted to yield approximately half as much hydrogen peroxide as would be expected for the same solution delivered at atmospheric pressure.

The gas phase use of hydrogen peroxide has been limited by, inter alia, Raoult's Law, as well as safety, handling, and purity concerns. Therefore, a technique is needed to overcome these limitations and, specifically, to provide substantially water-free gaseous hydrogen peroxide suitable for use in micro-electronics and other critical process applications.

SUMMARY OF CERTAIN EMBODIMENTS

Methods, systems, and devices for delivering a substantially water-free hydrogen peroxide gas stream are provided. The methods, systems, and devices are particularly useful in micro-electronics applications and other critical processes. Generally, the methods comprise (a) providing a non-aqueous hydrogen peroxide solution having a vapor phase separated from the hydrogen peroxide solution by a membrane; (b) contacting a carrier gas or vacuum with the vapor phase; and (c) delivering a gas stream comprising substantially water-free hydrogen peroxide to a critical process or application. By adjusting the operating conditions of the methods, e.g., the temperature and pressure of the carrier gas or vacuum, the concentration of the hydrogen peroxide solution, and the temperature and pressure of the hydrogen peroxide solution, hydrogen peroxide can be precisely and safely delivered as a process gas. In certain embodiments, the amount of hydrogen peroxide in the vapor phase and delivered to the critical process or application can be controlled by adding energy to the hydrogen peroxide solution, e.g., thermal energy, rotational energy, or ultrasonic energy.

Systems and devices for delivering hydrogen peroxide using the methods described herein are also provided. Generally, the systems and devices comprise (a) a non-aqueous hydrogen peroxide solution having a vapor phase separated from the hydrogen peroxide solution by a membrane; (b) a carrier gas or vacuum in fluid contact with the vapor phase; and (c) an apparatus for delivering a gas stream comprising hydrogen peroxide to a critical process or application. In certain embodiments, the apparatus for delivering a gas stream comprising hydrogen peroxide is an outlet of a head space, containing the vapor phase, that is connected directly or indirectly to a micro-electronics application or other critical process system, allowing the hydrogen peroxide containing gas stream to flow from the head space to the application or process in which it will be used. The hydrogen peroxide delivery assembly (HPDA) described herein is one such device. By adjusting the operating conditions of the systems and devices, e.g., the temperature and pressure of the carrier gas or vacuum, the concentration of the hydrogen peroxide solution, and the temperature and pressure of the hydrogen peroxide solution, hydrogen peroxide can be precisely and safely delivered as a process gas. In certain embodiments, the amount of hydrogen peroxide in the vapor phase and delivered to the critical process or application can be controlled by adding energy to the hydrogen peroxide solution, e.g., thermal energy, rotational energy, or ultrasonic energy.

The methods, systems, and devices described herein are generally applicable to a wide variety of non-aqueous hydrogen peroxide solutions. Exemplary non-aqueous solutions are solutions containing alcohols, including polyalcohols, phenols, lactones, amides, esters, including polyesters, ethers, carboxylic acids, including polycarboxylic acids, sulfonic acids, sulfinic acids, phosphonic acids, phosphinic acids, organic solvents, inorganic solvents, aromatic compounds, polyaromatic compounds, heterocyclic compounds, including polyheterocyclic compounds, fluorinated ethers, fluorinated alcohols, fluorinated sulfonic acids, fluorinated carboxylic acids, including polycarboxylic acids, fluorinated phosphonic acids, deep eutectic solvents, such as those disclosed in U.S. Pat. No. 3,557,009 and herein incorporated by reference, and combinations thereof that do not contain substantial amounts of water. Exemplary solvents include diethyl phthalate, propylene carbonate, triethylphosphate, polyvinylpyrroidone, polyvinylalcohol, polyvinylacetate-polyvinylpyrrolidone co-polymer, mellitic acid, benzenehexol, tetrahydobenzoquinone, 1,8-octanediol, 2,6-dichlorophenol, acridine, 8-hydroxyquinoline, benzylic acid, 1,4-dioxane, amyl acetate, DMF, DMSO, dimethylacetamide, 2-ethyl-1-hexanol, furfuryl alcohol, 2-octanol, 2-methyl-2-heptanol, and combinations thereof.

A number of the solvents discussed herein may be solids at ambient temperature and pressure, but they form liquid solutions when mixed with the applicable amount of hydrogen peroxide under the applicable operating conditions, e.g., 30% hydrogen peroxide at 15° C. to 60° C. Preferably, the solvent has one or more of the following properties: (1) is substantially impermeable to the membrane separating the hydrogen peroxide solution and head space; (2) does not substantially react with hydrogen peroxide under the operating applicable conditions, including the presence of the membrane, which may have catalytic properties; (3) does not substantially react with the membrane under the applicable operating conditions; and (4) is relatively non-volatile under the operating conditions. In certain embodiments, membrane-permeable solvents may be used, provided that they are sufficiently non-volatile (b.p. >200° C., preferably b.p. >250° C.) so that they may be readily removed from the gas stream. A suitable solvent or solvent mixture will be miscible with hydrogen peroxide. The dielectric constant of hydrogen peroxide in concentrations above 70% decreases, thus, suitable hydrogen peroxide miscible solvents may be organic solvents (see, e.g., *Hydrogen Peroxide*, Schumb, pp. 261-263). The device may be operated at an elevated temperature, thus compounds that are solid at room temperature may be useful as solvents in certain embodiments of the present invention, provided that the device is operated at a temperature that allows for the solvent to form a solution with hydrogen peroxide.

The solutions may optionally comprise inorganic and/or organic stabilizers used for hydrogen peroxide, which may include, but is not limited to, sodium stannate, phosphoric acid, pyrophosphates, phosphonates, phosphites, and combinations thereof. In a preferred embodiment, the stabilizer does not permeate the membrane. In another embodiment, the stabilizer is removed from the process gas prior to the delivery to a critical process or application. In some embodiments, a compound may serve a dual purpose as a solvent and stabilizer, particularly when the compound is acidic.

In certain embodiments, the solution comprises from about 5% to about 99% hydrogen peroxide, with the remaining components comprising solvents and/or stabilizers. In a preferred embodiment, the hydrogen peroxide solution comprises a diethyl phthalate $H_2O_2$ solution, particularly a 15-30% $H_2O_2$ solution. In another preferred embodiment, the hydrogen peroxide solution comprises a propylene carbonate $H_2O_2$ solution, particularly a 30% $H_2O_2$ solution. Selection of an appropriate non-aqueous hydrogen peroxide solution will be determined by the requirements of a particular application or process.

The methods, systems, and devices provided herein can employ a variety of membranes. The membrane is typically a selectively permeable membrane, particularly a substantially gas-impermeable membrane, e.g., a perfluorinated ion-exchange membrane, such as a NAFION® membrane. In certain embodiments, the NAFION® membrane may be chemically treated e.g., with an acid, base, or salt to modify its reactivity. For example, in certain embodiments, the NAFION® membrane may be treated in a way to form the ammonium species. By using certain selectively permeable membranes, which typically are substantially gas-impermeable membranes and specifically NAFION® membranes and its derivatives, the concentration of the hydrogen peroxide gas in the resultant gas stream may be altered relative to the hydrogen peroxide concentration that would be obtained directly from the vapor of the hydrogen peroxide solution in the absence of a membrane. In certain embodiments, the hydrogen peroxide gas concentration is amplified (i.e., higher than) the concentration that would be expected from the vapor of the hydrogen peroxide solution absent the membrane. Preferably, the concentration of hydrogen peroxide is amplified using the methods, systems, and devices disclosed herein.

The methods, systems, and devices provided herein may further comprise removing one or more components from the hydrogen peroxide containing gas stream to produce a purified hydrogen peroxide containing gas stream, e.g., using a device that selectively or non-selectively removes components from the gas stream. Preferred devices would be devices that substantially remove a non-reactive process gas from the hydrogen peroxide containing gas stream, while the amount of hydrogen peroxide in the gas stream is relatively unaffected. For example, a device may remove any non-solvents or stabilizers from the gas stream, including without limitation any traces of water or non-aqueous solvents. For example, the devices may further comprise a purifier positioned downstream of the head space. Particularly preferred purifier devices are membrane contactors, molecular sieves, activated charcoal, and other adsorbents, if they have the desired characteristics to meet the application or process requirements. A preferred characteristic of the gas removal device is the ability to remove certain component(s) in a relatively selective manner while allowing the remaining component(s) to remain in the hydrogen peroxide gas stream relatively unaffected.

The devices provided herein may further comprise various components for containing and controlling the flow of the gases and liquids used therein. For example, the devices may further comprise mass flow controllers, valves, check valves, pressure gauges, regulators, rotameters, and pumps. The devices provided herein may further comprise various heaters, thermocouples, and temperature controllers to control the temperature of various components of the devices and steps of the methods.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the embodiments and claims.

It is to be understood that both the foregoing general description and the following detailed description are exemplary and explanatory only and are not restrictive of the invention.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 1A is a diagram illustrating a part of a membrane assembly useful in certain embodiments of the present invention.

FIG. 1B is a diagram illustrating an embodiment of a hydrogen peroxide delivery assembly (HPDA) according to certain embodiments of the present invention.

FIG. 2B is a cross-sectional view of an embodiment of an HPDA according to certain embodiments of the present invention.

DETAILED DESCRIPTION OF CERTAIN EMBODIMENTS

Figure 2A:
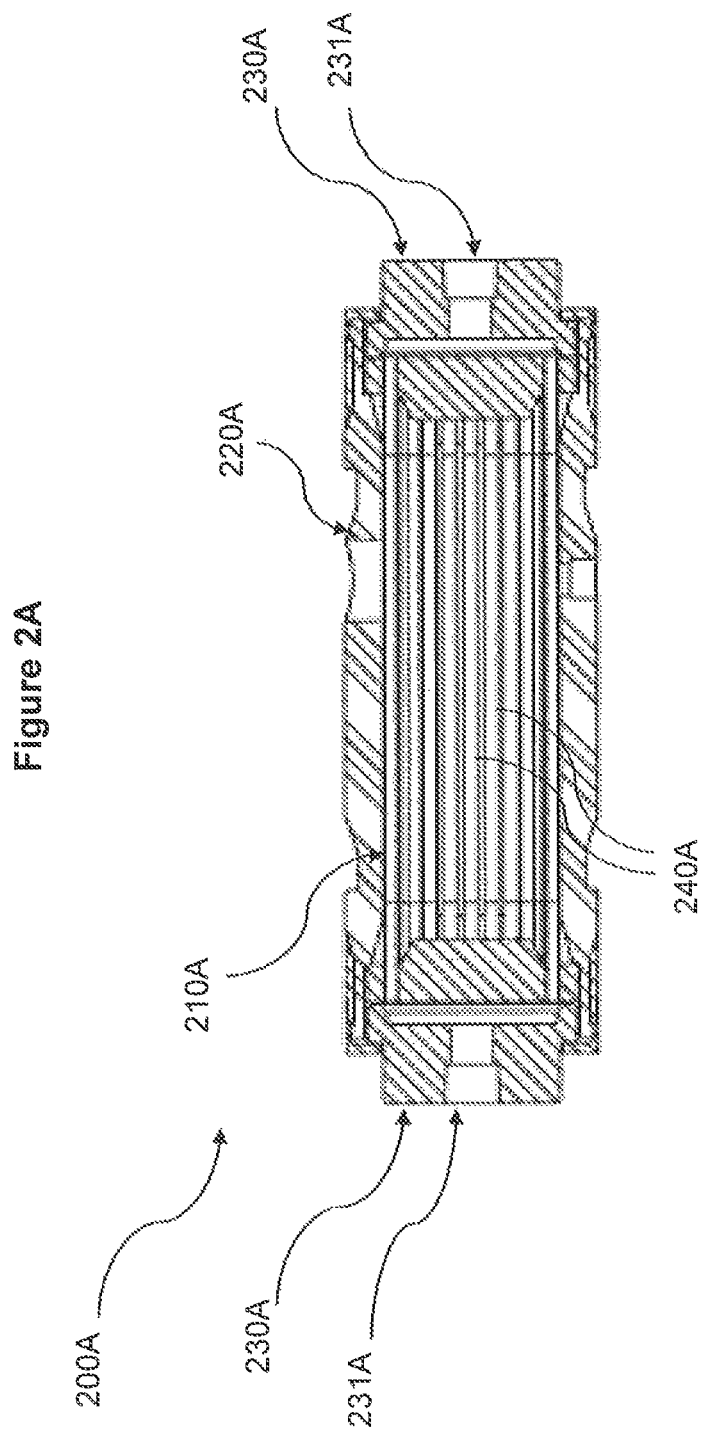
FIG. 2A is a cross-sectional view of an embodiment of an HPDA according to certain embodiments of the present invention.

The term "process gas" as used herein is a broad term, and is to be given its ordinary and customary meaning to a person of ordinary skill in the art (and is not to be limited to a special or customized meaning), and refers without limitation to a gas that is used in an application or process, e.g., a step in the manufacturing or processing of micro-electronics and in other critical processes. Exemplary process gases are inorganic acids, organic acids, inorganic bases, organic bases, and inorganic and organic solvents. A preferred process gas is hydrogen peroxide.

The term "reactive process gas" as used herein is a broad term, and is to be given its ordinary and customary meaning to a person of ordinary skill in the art (and is not to be limited to a special or customized meaning), and refers without limitation to a process gas that chemically reacts in the particular application or process in which the gas is employed, e.g., by reacting with a surface, a liquid process chemical, or another process gas.

The term "non-reactive process gas" as used herein is a broad term, and is to be given its ordinary and customary meaning to a person of ordinary skill in the art (and is not to be limited to a special or customized meaning), and refers without limitation to a process gas that does not chemically react in the particular application or process in which the gas is employed, but the properties of the "non-reactive process gas" provide it with utility in the particular application or process.

The term "carrier gas" as used herein is a broad term, and is to be given its ordinary and customary meaning to a person of ordinary skill in the art (and is not to be limited to a special or customized meaning), and refers without limitation to a gas that is used to carry another gas through a process train, which is typically a train of piping. Exemplary carrier gases are nitrogen, argon, hydrogen, oxygen, $CO_2$, clean dry air, helium, or other gases that are stable at room temperature and atmospheric pressure.

The term "head space" as used herein is a broad term, and is to be given its ordinary and customary meaning to a person of ordinary skill in the art (and is not to be limited to a special or customized meaning), and refers without limitation to a volume of gas in fluid contact with a hydrogen peroxide solution that provides at least a portion of the gas contained in the head space. There may be a permeable or selectively permeable barrier separating the head space, that is optionally in direct contact with the hydrogen peroxide solution. In those embodiments where the membrane is not in direct contact with the hydrogen peroxide solution, more than one head space may exist, i.e. a first head space directly above the solution that contains the vapor phase of the solution and a second head space separated from the first head space by a membrane that only contains the components of the first space that can permeate the membrane, e.g., hydrogen peroxide. In those embodiments with a hydrogen peroxide solution and a head space separated by a substantially gas-impermeable membrane, the head space may be located above, below, or on any side of the hydrogen peroxide solution, or the head space may surround or be surrounded by the hydrogen peroxide solution. For example, the head space may be the space inside a substantially gas-impermeable tube running through the hydrogen peroxide solution or the hydrogen peroxide solution may be located inside a substantially gas-impermeable tube with the head space surrounding the outside of the tube.

The term "substantially gas-impermeable membrane" as used herein is a broad term, and is to be given its ordinary and customary meaning to a person of ordinary skill in the art (and is not to be limited to a special or customized meaning), and refers without limitation to a membrane that is relatively permeable to other components that may be present in a gaseous or liquid phase, e.g., hydrogen peroxide, but relatively impermeable to other gases such as, but not limited to, hydrogen, nitrogen, oxygen, carbon monoxide, carbon dioxide, hydrogen sulfide, hydrocarbons (e.g., ethylene), volatile acids and bases, refractory compounds, and volatile organic compounds.

The term "ion exchange membrane" as used herein is a broad term, and is to be given its ordinary and customary meaning to a person of ordinary skill in the art (and is not to be limited to a special or customized meaning), and refers without limitation to a membrane comprising chemical groups capable of combining with ions or exchanging with ions between the membrane and an external substance. Such chemical groups include, but are not limited to, sulfonic acid, carboxylic acid, sulfonamide, sulfonyl imide, phosphoric acid, phosphinic acid, arsenic groups, selenic groups, phenol groups, and salts thereof.

The term "non-aqueous solution" as used herein is a broad term, and is to be given its ordinary and customary meaning to a person of ordinary skill in the art (and is not to be limited to a special or customized meaning), and refers to a solution comprising two or more components containing less than 10% water.

The term "solvent" as used herein is a broad term, and is to be given its ordinary and customary meaning to a person of ordinary skill in the art (and is not to be limited to a special or customized meaning), and refers to any compound that produces a liquid when mixed with a solute, such as hydrogen peroxide, in the applicable ratio under the applicable operating conditions.

The advantageous hydrogen peroxide delivery provided by the present invention, and specifically the methods, systems, and devices of certain embodiments described herein, is preferably obtained using a membrane contactor. In a preferred embodiment, a non-porous membrane is employed to provide a barrier between the hydrogen peroxide solution and the head space that is in fluid contact with a carrier gas or vacuum. Preferably, hydrogen peroxide rapidly permeates across the membrane, while gases are excluded from permeating across the membrane into the solution. In some embodiments the membrane may be chemically treated with an acid, base, or salt to modify the properties of the membrane.

In certain embodiments, the hydrogen peroxide is introduced into a carrier gas or vacuum through a substantially gas-impermeable ionic exchange membrane. Gas impermeability can be determined by the "leak rate." The term "leak rate" as used herein is a broad term, and is to be given its ordinary and customary meaning to a person of ordinary skill in the art (and is not to be limited to a specialized or customized meaning), and refers without limitation to the volume of a particular gas that penetrates the membrane surface area per unit of time. For example, a substantially gas-impermeable membrane could have a low leak rate of gases (e.g., a carrier gas) other than a process gas (e.g., hydrogen peroxide), such as a leak rate of less than about 0.001 $cm^3/cm^2/s$ under standard atmospheric temperature and pressure. Alternatively, a substantially gas-impermeable membrane can be identified by a ratio of the permeability of a process gas vapor compared to the permeability of other gases. Preferably, the substantially gas-impermeable membrane is more permeable to such process gases than to other gases by a ratio of at least 10,000:1, such as a ratio of at least about 20,000:1, 30,000:1, 40,000:1, 50,000:1, 60,000:1, 70,000:1, 80,000:1, 90,000:1 or a ratio of at least 100,000:1, 200,000:1, 300,000:1, 400,000:1, 500,000:1, 600,000:1, 700,000:1, 800,000:1, 900,000:1 or even a ratio of at least about 1,000,000:1. However, in other embodiments, other ratios that are less than 10,000:1 can be acceptable, for example 1.5:1, 2:1, 3:1, 4:1, 5:1, 6:1, 7:1, 8:1, 9:1, 10:1; 50:1, 100:1, 500:1, 1,000:1, or 5,000:1 or more.

In certain embodiments, the membrane is an ion exchange membrane, such as a polymer resin containing exchangeable ions. Preferably, the ion exchange membrane is a fluorine-containing polymer, e.g., polyvinylidenefluoride, polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluorideproylene hexafluoride-ethylene tetrafluoride terpolymers, ethylene tetrafluoride-propylene rubber, and fluorinated thermoplastic elastomers. Alternatively, the resin comprises a composite or a mixture of polymers, or a mixture of polymers and other components, to provide a contiguous membrane material. In certain embodiments, the membrane material can comprise two or more layers. The different layers can have the same or different properties, e.g., chemical composition, porosity, permeability, thickness, and the like. In certain embodiments, it can also be desirable to employ a layer (e.g., a membrane) that provides support to the filtration membrane, or possesses some other desirable property.

The ion exchange membrane is preferably a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the tradenames NAFION® (E.I. du Pont de Nemours & Company), 3M Ionomer (Minnesota Mining and Manufacturing Co.), FLEMION® (Asashi Glass Company, Ltd.), and ACIPLEX® (Asashi Chemical Industry Company).

In preparing a hydrogen peroxide containing gas stream, a hydrogen peroxide solution can be passed through the membrane. The term "passing a hydrogen peroxide solution through a membrane" as used herein is a broad term, and is to be given its ordinary and customary meaning to a person of ordinary skill in the art (and is not to be limited to a special or customized meaning), and refers without limitation to contacting a first side of a membrane with the hydrogen peroxide solution, such that the hydrogen peroxide passes through the membrane, and obtaining a hydrogen peroxide containing gas stream on the opposite side of the membrane. The first and second sides can have the form of substantially flat, opposing planar areas, where the membrane is a sheet. Membranes can also be provided in tubular or cylindrical form where one surface forms the inner position of the tube and an opposing surface lies on the outer surface. The membrane can take any form, so long as the first surface and an opposing second surface sandwich a bulk of the membrane material. Depending on the processing conditions, nature of the hydrogen peroxide solution, volume of the hydrogen peroxide solution's vapor to be generated, and other factors, the properties of the membrane can be adjusted. Properties include, but are not limited to physical form (e.g., thickness, surface area, shape, length and width for sheet form, diameter if in fiber form), configuration (flat sheet(s), spiral or rolled sheet(s), folded or crimped sheet(s), fiber array(s)), fabrication method (e.g., extrusion, casting from solution), presence or absence of a support layer, presence or absence of an active layer (e.g., a porous prefilter to adsorb particles of a particular size, a reactive prefilter to remove impurities via chemical reaction or bonding), and the like. It is generally preferred that the membrane be from about 0.5 microns in thickness or less to 2000 microns in thickness or more, preferably from about 1, 5, 10, 25, 50, 100, 200, 300, 400, or 500 microns to about 600, 700, 800, 900, 1000, 1100, 1200, 1300, 1400, 1500, 1600, 1700, 1800, or 1900 microns. When thinner membranes are employed, it can be desirable to provide mechanical support to the membrane (e.g., by employing a supporting membrane, a screen or mesh, or other supporting structure), whereas thicker membranes may be suitable for use without a support. The surface area can be selected based on the mass of vapor to be produced.

Certain embodiments of the methods, systems, and devices provided herein, in which a carrier gas or vacuum can be used to deliver substantially water-free hydrogen peroxide, are shown by reference to FIGS. 1-8.

According to certain embodiments of the present invention, a hydrogen peroxide delivery assembly (HPDA) is provided. An HPDA is a device for delivering hydrogen peroxide into a process gas stream, e.g., a carrier gas used in a critical process application, e.g., micro-electronics manufacturing or other critical process applications. An HPDA may also operate under vacuum conditions. An HPDA may have a variety of different configurations comprising at least one membrane and at least one vessel containing a non-aqueous hydrogen peroxide solution and a head space separated from the solution by membrane.

FIGS. 1A and 1B depict different views of one embodiment of an HPDA 100 and a membrane assembly 110 that forms part of an HPDA that can be used as provided herein. FIG. 1A shows membrane assembly 110 comprising a plurality membranes 120, for example, 5R NAFION® membrane, which can be configured as lumens. As depicted in FIG. 1A, membranes 120 configured into lumens are inserted into a collector plate 130 through a plurality of holes within collector plate 130. Membrane assembly 110 also comprises a plurality of polytetrafluoroethylenene (PTFE) rods 140 inserted into collector plate 130. As shown in FIG. 1B, as part of HPDA 100, membrane assembly 110 comprises membrane lumens 120 spanning collector plates 130, HPDA 100 further comprises endcaps 150 at each end of membrane assembly 110. Endcaps 150 further include branches 160, which can be fitted with tubing to provide access to the interior of HPDA 100, e.g., to fill, empty, clean, or refill the HPDA.

FIG. 2A and FIG. 2B show a cross-sectional view of two embodiments of HPDAs according to certain embodiments of the present invention.

HPDA 200A, as shown in FIG. 2A, comprises a membrane assembly 210A within a shell housing 220A and end caps 230A configured to couple to shell housing 220A. Membrane assembly 210A comprises a plurality of membranes 240A, which can be configured as lumens. The number of lumens can vary depending on various factors, including the size of the lumens, the size of HPDA 200A, and the operating conditions of the HPDA. In certain embodiments, an HPDA may contain up to 1000 membrane lumens, up to 500 lumens, up to 200 lumens, up to 100 lumens, or up to 50 lumens. For example, HPDA 200A may have about 20-50 membrane lumens. The membrane lumens can be constructed from a perfluorinated sulfonic acid membrane, for example, 5R NAFION® membrane. The end caps 230A and shell housing 220A can be formed from a variety of materials, for example, PTFE, stainless steel (such as 316 stainless steel), or other suitable materials. Each end cap 230A further comprises a gas connection 231A. Gas connection 231A can take the form of a variety of connection configurations and sizes, for example, ¼" VCR, ¼" NPT, or other suitable connectors.

HPDA 200B, as shown in FIG. 2B, comprises a membrane assembly 210B within a shell housing 220B and end caps 230B configured to couple to shell housing 220B. Membrane assembly 210B can be comprised of a plurality of membrane lumens (not shown), The number of lumens can vary depending on various factors, including the size of the lumens, the size of HPDA 200B, and the operating conditions of the HPDA. In certain embodiments, an HPDA may contain up to 1000 membrane lumens, up to 500 lumens, up to 200 lumens, up to 100 lumens, or up to 50 lumens. For example, HPDA 200B may have about 20-50 membrane lumens. The membrane lumens can be constructed from a perfluorinated sulfonic acid membrane, for example, 5R NAFION® membrane. The end caps 230B and shell housing 220B can be formed from a variety of materials, for example, PTFE, stainless steel (such as 316 stainless steel), or other suitable materials. Each end cap 230B can comprise a gas connection 231B. Gas connection 231B can take the form of a variety of connection configurations and sizes, for example, ¼" VCR, ¼" NPT, or other suitable connectors.

According to the various embodiments, the HPDA can be filled with a non-aqueous hydrogen peroxide containing solution, while maintaining a head separated from the hydrogen peroxide containing solution by a membrane. Because the membrane is permeable to hydrogen peroxide and substantially impermeable to the other components of the solution, the head space will contain substantially pure hydrogen peroxide vapor in a carrier gas or vacuum, depending upon the operating conditions of the process.

According to various embodiments, an HPDA can be constructed similarly to the devices described in commonly assigned U.S. Pat. No. 7,618,027, which is herein incorporated by reference.

An embodiment according to an aspect of the methods, systems, and devices provided herein is described below by reference to a manifold 300, as shown by reference to FIG. 3. According to the embodiment shown by reference to FIG. 3, a carrier gas 310 flows through the head space of HPDA 320, which can be an HPDA as described above. A mass flow controller (MFC) 330, for example, Unit UFC-1260A 1 slm, can be used to control the flow rate of carrier gas 310, which can be typically set to 1 slm. Analysis of the amount of hydrogen peroxide in the gas stream typically requires dilution of the resultant gas stream, which can be accomplished with dilution gas 350. A mass flow controller (MFG) 340, for example, a Unit UFC-1260A 10 slm can be used to control the flow rate of dilution gas 350. Carrier gas 310 and dilution gas 350 can be supplied by a gas source 360, which can be typically nitrogen or other suitable carrier gas. A valve 370 can be used to isolate the dilution line when it is not required. Check valves 371, 372 can be placed downstream of both MFC 330 and MFC 340 to protect them from possible $H_2O_2$ exposure. A 60 psig pressure gauge 373 can be placed between MFC 330 and check valve 372 to insure that the manifold's pressure does not exceed the maximum pressure allowed by $H_2O_2$ analyzer 380, e.g., 5 psig.

The nitrogen pressure can be maintained with a forward pressure regulator 374, typically set to 15 psig. A thermocouple 375 can measure the temperature of nitrogen carrier gas 310 before it enters HPDA 320 for $H_2O_2$ addition. A thermocouple 376 can measure the temperature of the 30% hydrogen peroxide solution in HPDA 100. A thermocouple 377 can measure the gas temperature before entering $H_2O_2$ analyzer 380. $H_2O_2$ analyzer 380 can pull in a 500 sccm sample of carrier gas 310 to measure the $H_2O_2$ concentration. Manifold 300 can further comprise a relative humidity/resistance temperature detector (RH/RTD) probe 378. A heater tape 390 can be placed on certain sections as indicated in FIG. 3. The manifold's temperature can be controlled in two separate zones, the membrane assemblies and the remaining tubing, with a Trilite Equipment & Technologies Controller and a Watlow 96 Controller, respectively. The entire manifold can be set up inside of a fume hood.

Figure 3:
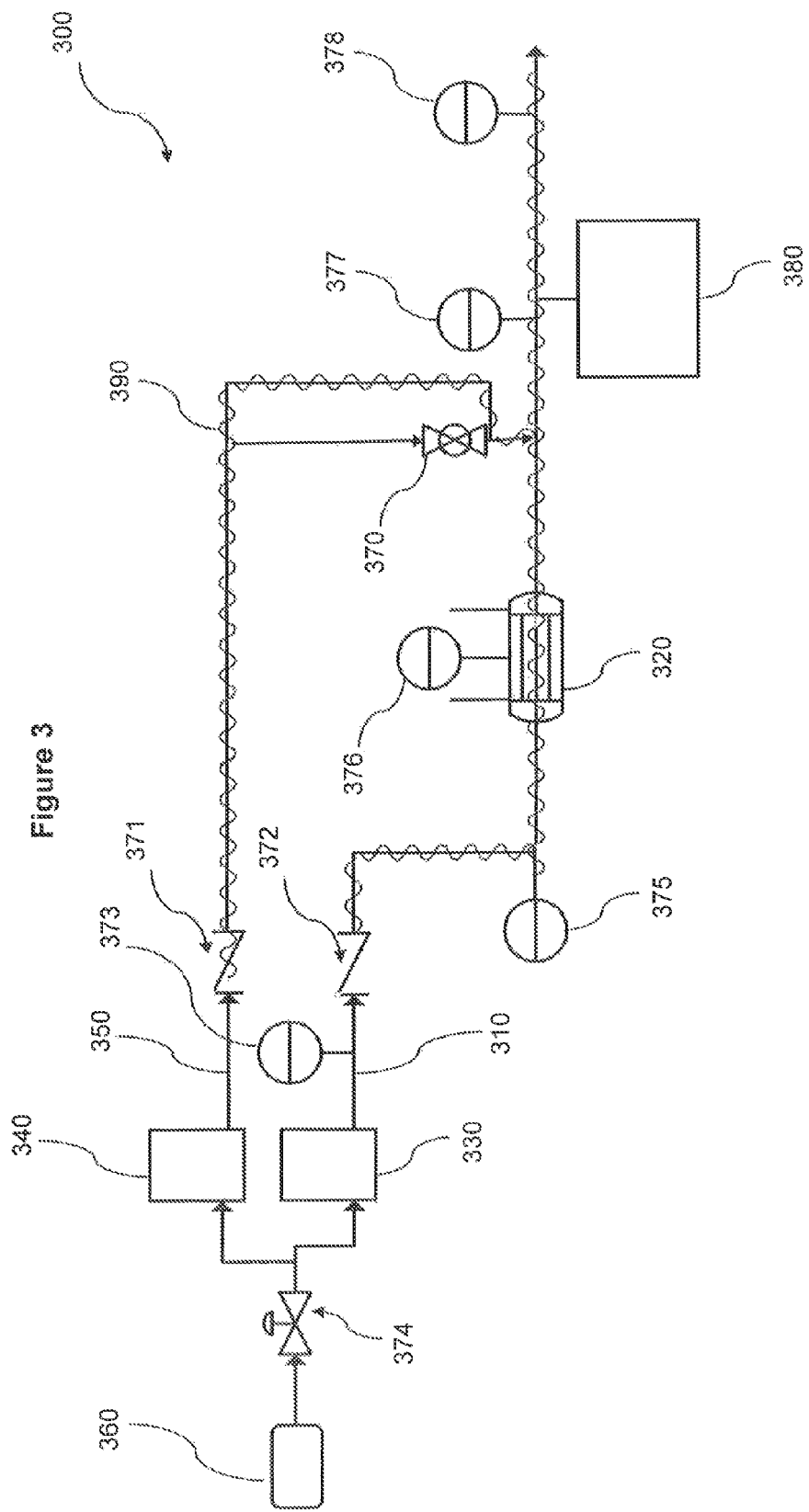
FIG. 3 is a P&ID of a manifold that can be used to test methods, systems, and devices for $H_2O_2$ delivery according to certain embodiments of the present invention.

The embodiment shown by reference to FIG. 3 is set up as a test apparatus to measure the amount of hydrogen peroxide introduced into a carrier gas stream under various operating conditions of an HPDA. It will be understood that a similar apparatus can be used to deliver hydrogen peroxide to a critical process application.

Figure 4:
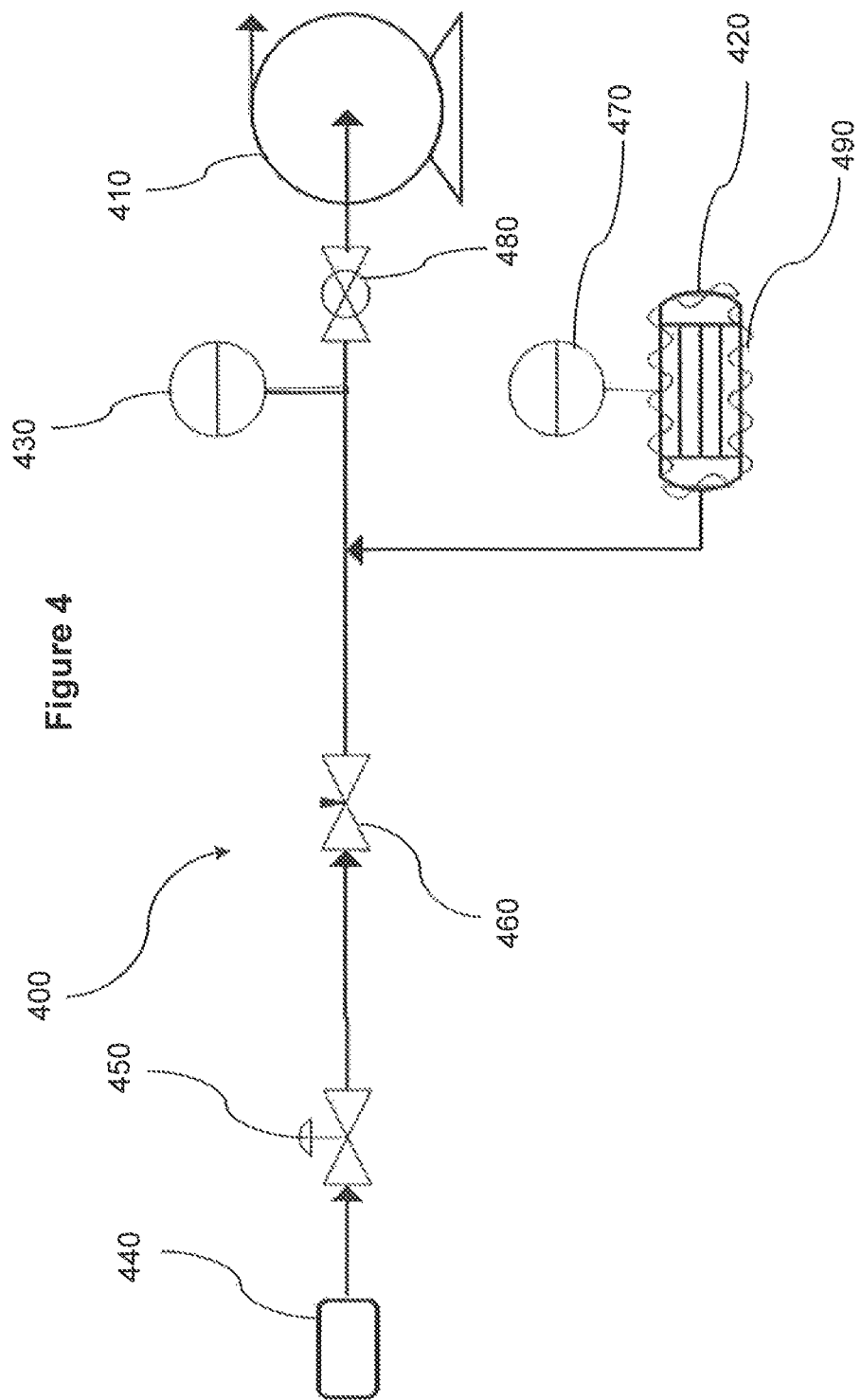
FIG. 4 is a P&ID of a manifold that can be used to test methods, systems, and devices for $H_2O_2$ delivery according to certain embodiments of the present invention.

FIG. 4 is a P&ID of a test manifold 400, according to another embodiment, used to demonstrate delivery of hydrogen peroxide under vacuum conditions, according to the methods, systems, and devices provided herein. According to the embodiment shown by reference to FIG. 4, a vacuum pump 410 removes gas from the hydrogen peroxide containing vapor side (i.e., head space) of HPDA 420, which can be an HPDA as described above. For example, vacuum pump 410 can be maintained at about 24 mmHg using a valve 480 and a pressure gauge 430. A gas source 440 can be maintained at a pressure of about 2 psig with a forward pressure regulator 450. A valve 460 can be used as a flow restrictor. A thermocouple 470 can be placed inside the filling tube of a HPDA 420 to measure the solution's temperature inside the shell of HPDA 420. The test involves contacting the vapor side, i.e., head space, of HPDA 420 to a vacuum produced by vacuum pump 410 while holding HPDA 420 at a constant temperature. A heat tape 490 can be placed around HPDA 420 to allow for constant temperature control of the hydrogen peroxide containing solution within HPDA 420. This vacuum-based method, system, and device is particularly preferred in numerous micro-electronics and other critical process applications that are operated at relatively reduced pressures (i.e., under vacuum).

The embodiment shown by reference to FIG. 4 is set up as a test apparatus to measure the amount of hydrogen peroxide introduced into a carrier gas stream under various operating conditions of an HPDA. It will be understood that a similar apparatus can be used to deliver hydrogen peroxide to a critical process application.

Figure 5:
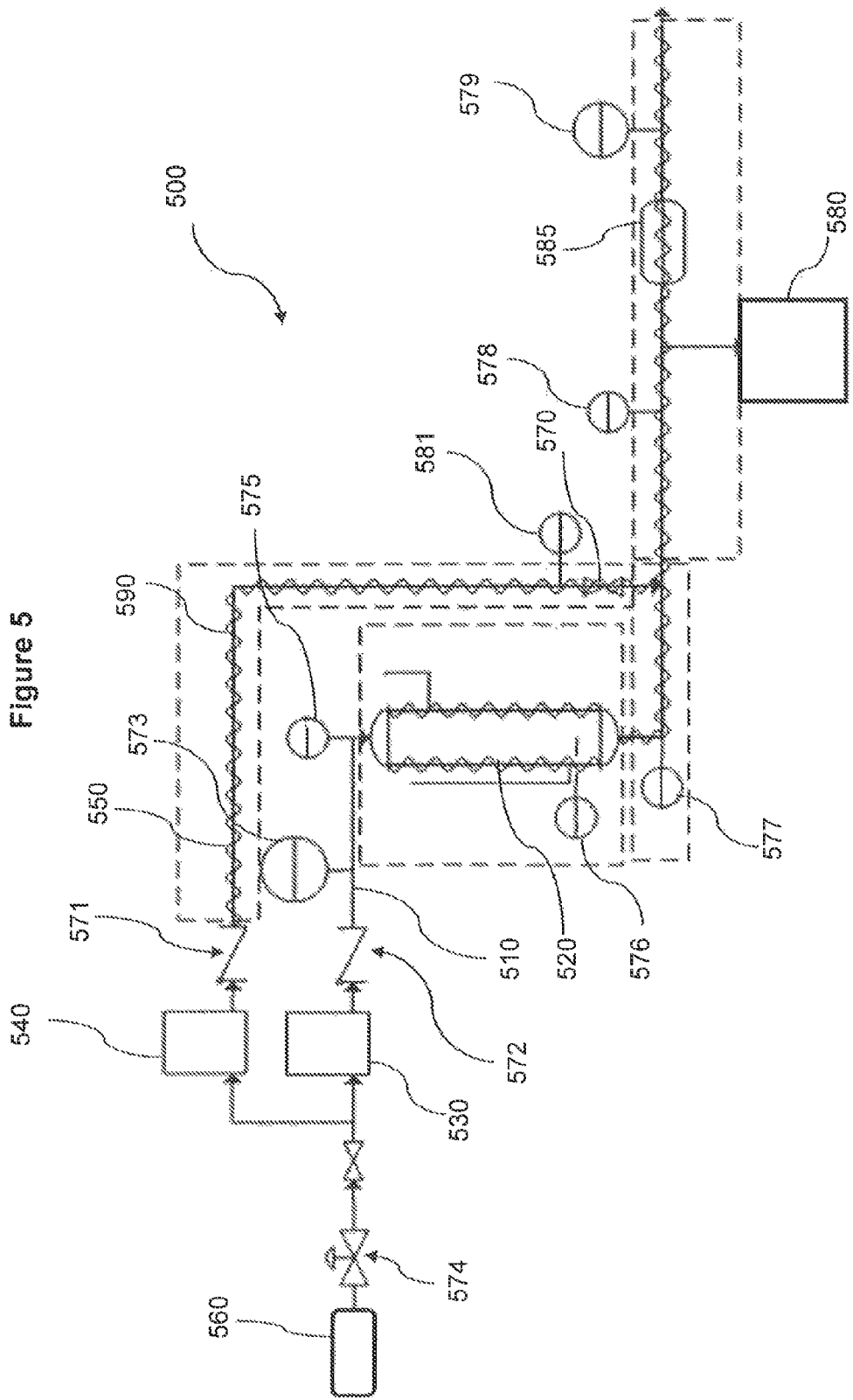
FIG. 5 is a P&ID of a manifold that can be used to test methods, systems, and devices for $H_2O_2$ delivery according to certain embodiments of the present invention.

FIG. 5 is a P&ID of a test manifold 500, according to another embodiment, used to demonstrate delivery of hydrogen peroxide, according to an aspect of the methods, systems, and devices provided herein. As shown in FIG. 5, a nitrogen carrier gas 510 can flow through the head space of HPDA 520, which can be an HPDA as described above. A mass flow controller (MFC) 530, for example, a Brooks SLA5850S1EAB1B2A1 5 slm, can be used to control the flow rate of nitrogen carrier gas 510, which can be typically set to 1 slm. Analysis of the amount of hydrogen peroxide in the gas stream typically requires dilution of the resultant gas stream, which can be accomplished with dilution gas 350. A mass flow controller (MFC) 540, for example, a Brooks SLA5850S1EAB1B2A1 10 slm, can be used to control the flow rate of a nitrogen dilution gas 550. Nitrogen carrier gas 510 and nitrogen dilution gas 550 can be supplied by a nitrogen gas source 560. A valve 570 can be used to isolate the dilution line when desired. A pair of check valves 571, 572 can be placed downstream of both MFC 530 and MFC 540 to protect them from possible $H_2O$ and $H_2O_2$ exposure. A pressure gauge 573, for example, 100 psi gauge, can be placed between MFC 330 and HPDA 520 to insure that the manifold's pressure does not exceed the maximum pressure allowed by an analyzer 580, which is 5 psig.

The nitrogen pressure can be maintained with a forward pressure regulator 574, typically set to 25 psig. A thermocouple 575 can measure the temperature of nitrogen carrier gas 510 before it enters HPDA 520 for $H_2O_2$ addition. Within HPDA 520, nitrogen carrier gas 510 can flow through the membrane tubes and peroxide vapor can permeate through the membrane from the solution contained within the shell housing and combined with carrier gas 510. A thermocouple 576 can measure the temperature of the hydrogen peroxide solution in HPDA 520. A thermocouple 577 can measure the gas temperature exiting HPDA 520. In this embodiment, an ozone analyzer 580 can be used to measure the $H_2O_2$ concentration in the gas stream. Ozone analyzer 580 can be, for example, a Teledyne 465L $O_3$ Analyzer utilizing UV absorption technology. The reading of ozone analyzer 580 should be multiplied by a concentration factor (e.g., 150) to obtain the $H_2O_2$ concentration. Ozone analyzer 580 can pull a sample of the hydrogen peroxide containing gas stream to measure the $H_2O_2$ concentration. A thermocouple 578 can be used to measure the gas temperature before entering ozone analyzer 580. A thermocouple 581 can be used to measure the temperature of nitrogen dilution gas 550.

Manifold 500 can further comprise a scrubber 585, for example, a Carulite 200 configured to remove the $H_2O_2$ by converting it into water and oxygen. Downstream of scrubber 585 can be a probe 579, for example, a E+E Elektronik EE371 humidity transmitter configured to measure the dew point (DP) and moisture concentration. Downstream of probe 579 can be a vent. A heater tape 590 can be placed on certain sections as indicated in FIG. 5. The manifold's temperature can be controlled in four separate zones, indicated by the dotted line boxes, with Watlow EZ-Zone® 96 controllers, respectively. The entire manifold can be set up inside of a fume hood.

The embodiment shown by reference to FIG. 5 is set up as a test apparatus to measure the amount of hydrogen peroxide introduced into a carrier gas stream under various operating conditions of an HPDA. It will be understood that a similar apparatus can be used to deliver hydrogen peroxide to a critical process application.

Manifold 500 as described above was utilized for test procedures as described below. The test procedures involved obtaining stable $H_2O_2$ readings utilizing non-aqueous $H_2O_2$ solutions. The solutions can be prepared in a manner similar to that described in U.S. Pat. No. 4,564,514, incorporate herein by reference, which describes a process for the production of water-free organic hydrogen peroxide solutions.

EXAMPLE 1

In one example, the non-aqueous solvent utilized was propylene carbonate (PC) having a molecular weight of 102.09 g/mol and a boiling point of about 240° C. at atmospheric pressure. The initial composition of the non-aqueous hydrogen peroxide solution for this test was about 28.5% $H_2O_2$/1.5% $H_2O$/70% PC. For this example, an HPDA like HPDA 200B shown in FIG. 2B was utilized. The HPDA housing utilized in this test procedure was constructed of 316 stainless steel.

Manifold 500, including the HPDA and hydrogen peroxide containing solution, was maintained at about 40° C. The carrier gas flow rate was 1 slm and the dilution gas flow rate was 8 slm. Dilution allowed for optimization of the concentration to the measurement range of ozone analyzer 580. In addition, dilution limited the possibility of sending high moisture concentrations to ozone analyzer 580, which can affect the accuracy of the readings.

Regarding relative humidity probe 579, in addition to applying the correction factor for the dilution, the $H_2O_2$ concentration was subtracted from the $H_2O$ concentration to account for the conversion of hydrogen peroxide into water vapor by scrubber 585.

Figure 6:
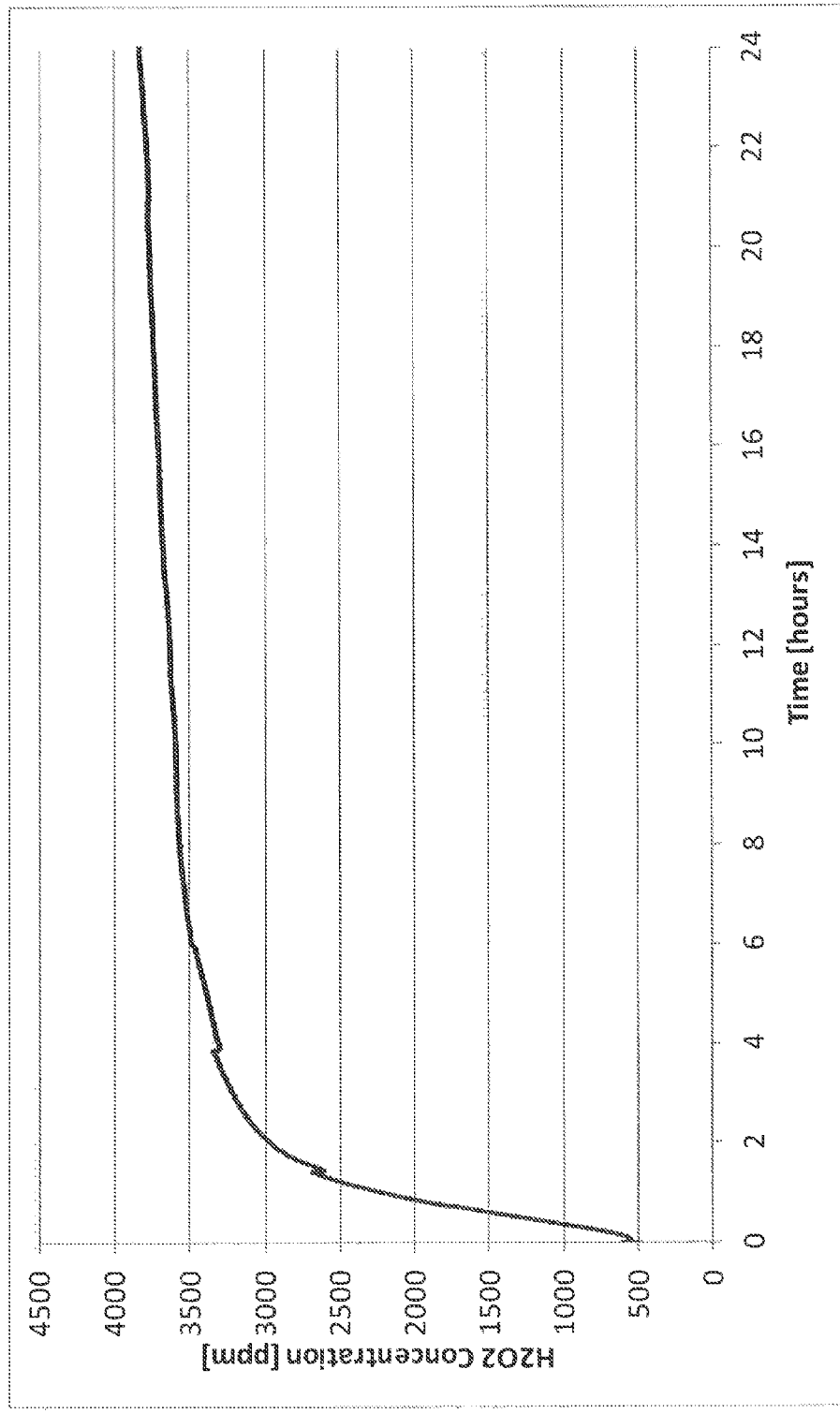
FIG. 6 is a chart depicting the $H_2O_2$ concentration measured during a test of a non-aqueous $H_2O_2$ solution, according to certain embodiments of the present invention.

The $H_2O_2$ concentration of the carrier gas reading from ozone analyzer 580 is depicted in FIG. 6. As shown in FIG. 6, after about 6 hours, the $H_2O_2$ concentration in the carrier gas output stabilized at about 3500-3900 ppm for about 17 hours.

Figure 7:
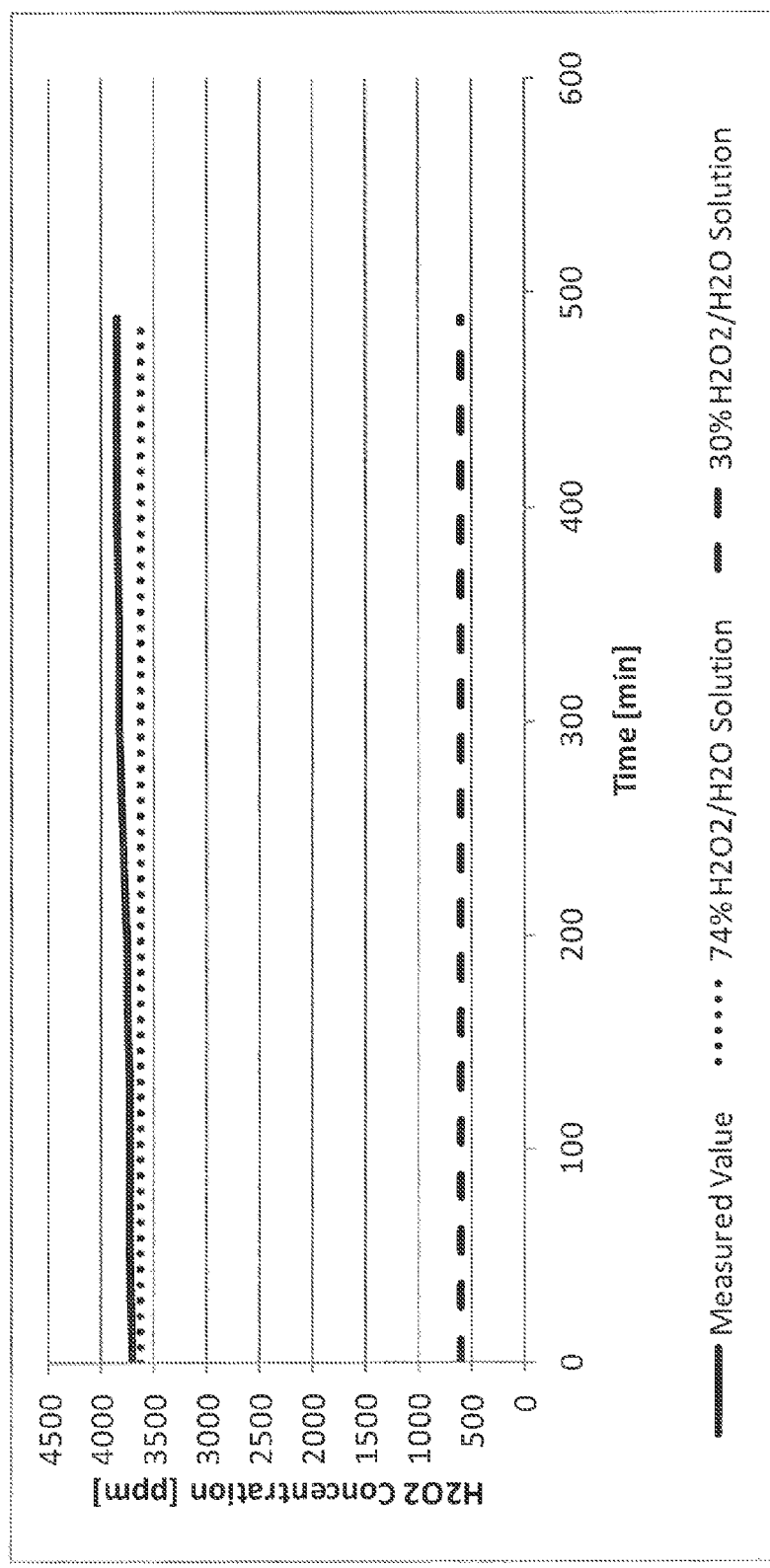
FIG. 7 is a chart depicting the $H_2O_2$ concentration measured during a test of a non-aqueous $H_2O_2$ solution along with theoretical $H_2O_2$ concentrations for a 30% aqueous solution and a 74% aqueous solution, according to certain embodiments of the present invention.

FIG. 7 depicts a portion of the $H_2O_2$ concentration data together with theoretical $H_2O_2$ concentrations that would be expected at 40° C., without a membrane, for a 30% $H_2O_2$ aqueous solution and a 74% $H_2O_2$ aqueous solution based on Raoult's Law (see, e.g., *Hydrogen Peroxide*, Schumb), As shown in FIG. 7, the $H_2O_2$ concentration in the carrier gas obtained using the non-aqueous PC solution was equivalent to what may be achieved from an about 74% $H_2O_2$ aqueous solution, which would be considered unsafe in many applications and processes.

As shown in Table 1, non-aqueous $H_2O_2$ solutions, for example, 28.5% $H_2O_2$/1.5% $H_2O$/70% PC, can provide stable readings of $H_2O_2$ as well as a low ratio of $H_2O$ to $H_2O_2$ in the process gas stream, which can be beneficial for many critical process applications. The initial concentration of the solution was 28.5% $H_2O_2$/2.4% $H_2O$/69.1% PC by weight and the final concentration of the solution was 30.2% $H_2O_2$/1.25% $H_2O$/68.55% PC by weight. Under the above operating conditions, this solution produced a consistent stream of $H_2O_2$ of about 3500-3900 ppm over a 17-hour period. Data from the humidity transmitters shows that some residual $H_2O$ is present, but this amount can decrease over time.

TABLE 1

| | Concentration in HPDA (%) | | | Concentration in Gas Stream (ppm) | |
|---|---|---|---|---|---|
| | $H_2O_2$ | $H_2O$ | PC | $H_2O_2$ | $H_2O$ |
| Initial | 28.5 | 2.4 | 69.1 | 3513 | 5836 |
| Final | 30.2 | 1.25 | 68.55 | 3833 | 3085 |

EXAMPLE 2

In another example, the non-aqueous solvent utilized was diethyl phthalate (DEP) having a molecular weight of 224.25 g/mol and a boiling point of about 298.5° C. at atmospheric pressure. The initial composition of the non-aqueous hydrogen peroxide solution was about 19.0% $H_2O_2$/1.0% $H_2O$/80.0% DEP. For this example, an HPDA like HPDA 200A shown in FIG. 2A was utilized. The HPDA housing utilized in this test procedure was constructed of PTFE.

Figure 8:
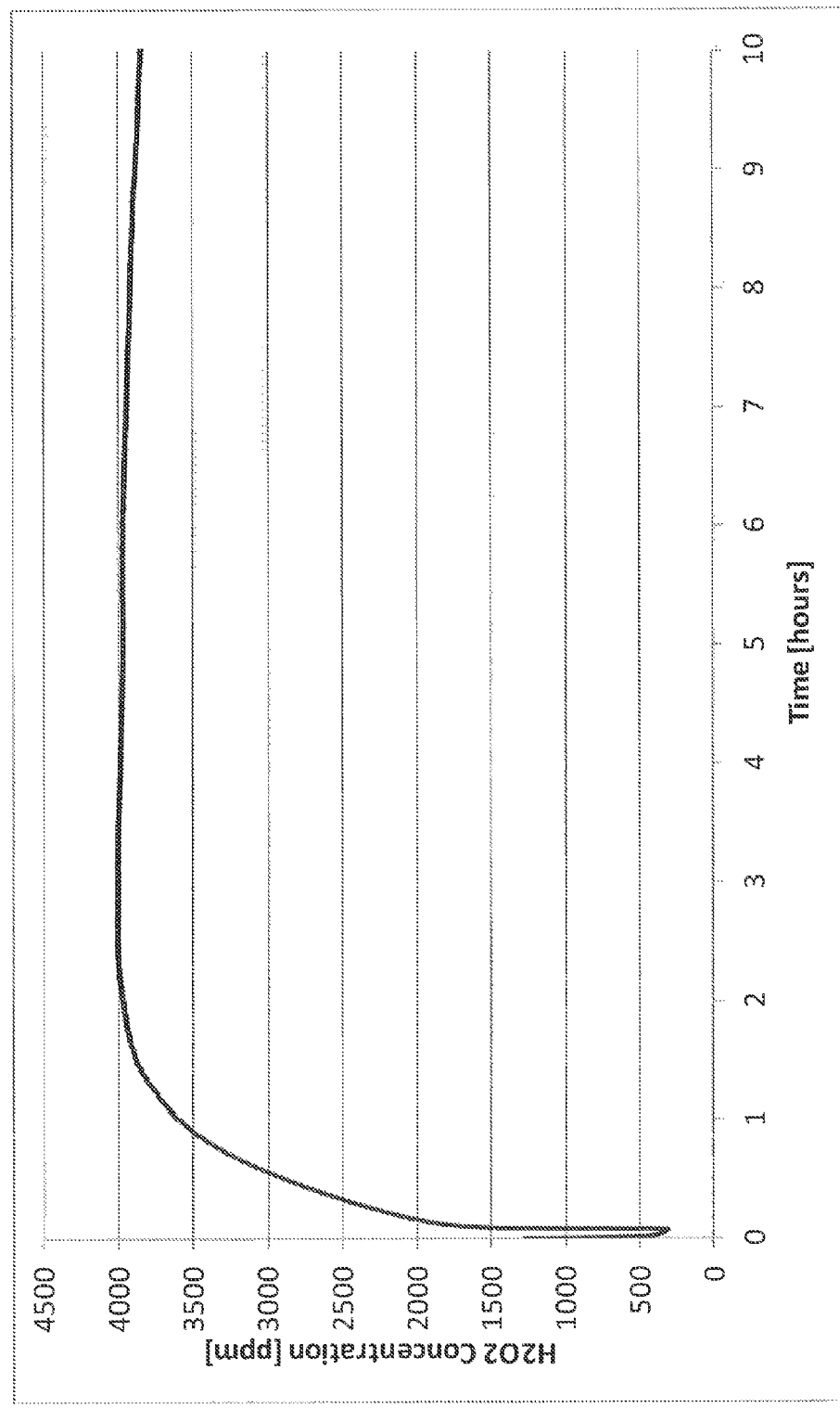
FIG. 8 is a chart depicting the $H_2O_2$ concentration measured during a test of a non-aqueous $H_2O_2$ solution, according to certain embodiments of the present invention.

Manifold 500, including the HPDA and hydrogen peroxide containing solution, was maintained at about 40° C. The carrier gas flow rate was 1 slm and the dilution gas flow rate was 8 slm. As shown in FIG. 8, after about 2 hours, the $H_2O_2$ output stabilized at about 3900-4000 ppm for about 8 hours.

As shown in Table 2, non-aqueous $H_2O_2$ solutions, for example, 19.0% $H_2O_2$/1.0% $H_2O$/80.0% DEP, can provide stable readings of $H_2O_2$ as well as a low ratio of $H_2O$ to $H_2O_2$ in the process gas stream, which can be beneficial for many critical process applications. The initial concentration of the solution was 19.0% $H_2O_2$/1.0% $H_2O$/80.0% DEP by weight and the final concentration of the solution was 17.0% $H_2O_2$/0.4% $H_2O$/82.6% PC PC by weight. Under the above operating conditions, this solution produced a consistent stream of $H_2O_2$ of about 3900-4000 ppm over an 8-hour period. Data from the humidity transmitters shows that some residual $H_2O$ is present, but this amount can decrease over time.

TABLE 2

| | Concentration in HPDA (%) | | | Concentration in Gas Stream (ppm) | |
|---|---|---|---|---|---|
| | $H_2O_2$ | $H_2O$ | DEP | $H_2O_2$ | $H_2O$ |
| Initial | 19.0 | 1.0 | 80.0 | 4005 | 4205 |
| Final | 17.0 | 0.4 | 82.6 | 3914 | 1860 |

By controlling the temperature of the hydrogen peroxide containing solution and, as applicable, the carrier gas or vacuum, particular hydrogen peroxide concentrations can be delivered. The selection of a particular hydrogen peroxide concentration will depend on the requirements of the application or process in which the hydrogen peroxide containing process gas will be used. In certain embodiments, the hydrogen peroxide containing gas stream may be diluted by adding additional carrier gas. In certain embodiments, the hydrogen peroxide containing gas stream may be combined with other process gas streams prior to or at the time of delivering hydrogen peroxide to an application or process. Alternatively or additionally, any residual solvent or stabilizers, or contaminants present in the hydrogen peroxide containing process gas may be removed in a purification (e.g., dehumidification) step using a purifier apparatus.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A method comprising:
   (a) providing a non-aqueous hydrogen peroxide solution having a vapor phase separated from the non-aqueous hydrogen peroxide solution by a membrane;
   (b) contacting a carrier gas or vacuum with the vapor phase; and
   (c) delivering a gas stream comprising at least 1000 parts per million (ppm) hydrogen peroxide to a critical process or application.
2. The method of claim 1, wherein hydrogen peroxide permeates the membrane at a faster rate than any other component of the non-aqueous hydrogen peroxide solution.

3. The method of claim 1, wherein the membrane is a substantially gas-impermeable membrane.

4. The method of claim 3, wherein the substantially gas-impermeable membrane comprises an ion exchange membrane.

5. The method of claim 1, wherein the hydrogen peroxide solution comprises at least one component selected from the group consisting of diethyl phthalate, propylene carbonate, triethylphosphate, polyvinylpyrroidone, polyvinylalcohol, polyvinylacetate-polyvinylpyrrolidone co-polymer, mellitic acid, benzenehexol, tetrahydobenzoquinone, 1,8-octanediol, 2,6-dichlorophenol, acridine, 8-hydroxyquinoline, benzylic acid, 1,4-dioxane, amyl acetate, DMF, DMSO, dimethylacetamide, 2-ethyl-l-hexanol, furfuryl alcohol, 2-octanol, 2-methyl-2-heptanol, and combinations thereof.

6. The method of claim 1, further comprising changing the concentration of at least one component of the vapor phase by changing at least one of the following parameters: (a) the temperature of the hydrogen peroxide solution, (b) the pressure of the hydrogen peroxide solution, (c) the concentration of the hydrogen peroxide solution, (d) the temperature of the carrier gas, (e) the pressure of the carrier gas or vacuum, (f) the surface area of the membrane, and (g) the flow rate of the carrier gas.

7. A chemical delivery system comprising:
(a) a non-aqueous hydrogen peroxide solution having a vapor phase separated from the non-aqueous hydrogen peroxide solution by a membrane;
(b) a carrier gas or vacuum in fluid contact with the vapor phase; and
(c) an apparatus for delivering a gas stream comprising at least 1000 ppm hydrogen peroxide to a critical process or application.

8. The chemical delivery system of claim 7, wherein hydrogen peroxide permeates the membrane at a faster rate than any other component of the non-aqueous hydrogen peroxide solution.

9. The chemical delivery system of claim 7, wherein the membrane is a substantially gas-impermeable membrane.

10. The chemical delivery system of claim 9, wherein the substantially gas-impermeable membrane comprises an ion exchange membrane.

11. The chemical delivery system of claim 7, wherein the hydrogen peroxide solution comprises at least one component selected from the group consisting of diethyl phthalate, propylene carbonate, triethylphosphate, polyvinylpyrroidone, polyvinylalcohol, polyvinyl acetate-polyvinylpyrrolidone co-polymer, mellitic acid, benzenehexol, tetrahydobenzoquinone, 1,8-octanediol, 2,6-dichlorophenol, acridine, 8-hydroxyquinoline, benzylic acid, 1,4-dioxane, amyl acetate, DMF, DMSO, dimethylacetamide, 2-ethyl-1-hexanol, furfuryl alcohol, 2-octanol, 2-methyl-2-heptanol, and combinations thereof.

12. A hydrogen peroxide delivery device comprising:
(a) A housing having within it at least one membrane;
(b) A non-aqueous hydrogen peroxide liquid solution contained within the housing; and
(c) A head space contained within the housing and separated from the non-aqueous hydrogen peroxide solution by the membrane, wherein the housing is configured to allow a carrier gas to flow through the head space to produce a gas stream comprising at least 1000ppm hydrogen peroxide to a critical process or application.

13. The device of claim 12, wherein hydrogen peroxide permeates the membrane at a faster rate than any other component of the non-aqueous hydrogen peroxide solution.

14. The device of claim 12, wherein the membrane is a substantially gas-impermeable membrane.

15. The device of claim 14, wherein the substantially gas-impermeable membrane comprises an ion exchange membrane.

16. The device of claim 12, wherein the hydrogen peroxide solution comprises at least one component selected from the group consisting of diethyl phthalate, propylene carbonate, triethylphosphate, polyvinylpyrroidone, polyvinylalcohol, polyvinylacetate-polyvinylpyrrolidone co-polymer, mellitic acid, benzenehexol, tetrahydobenzoquinone, 1,8-octanedial, 2,6-dichlorophenol, acridine, 8-hydroxyquinoline, benzylic acid, 1,4-dioxane, amyl acetate, DMF, DMSO, dimethylacetamide, 2-ethyl-1-hexanol, furfuryl alcohol, 2-octanol, 2-methyl-2-heptanol, and combinations thereof.

17. The device of claim 16, wherein the membrane is substantially impermeable to the component.

18. The device of claim 12, wherein the at least one membrane comprises a plurality of membrane lumens.

19. The method of claim 1, wherein the hydrogen peroxide solution comprises propylene carbonate.

20. The method of claim 1, wherein the hydrogen peroxide solution comprises diethyl phthalate.

21. The system of claim 7, wherein the hydrogen peroxide solution comprises propylene carbonate.

22. The system of claim 7, wherein the hydrogen peroxide solution comprises diethyl phthalate.

23. The device of claim 12, wherein the hydrogen peroxide liquid solution comprises propylene carbonate.

24. The device of claim 12, wherein the hydrogen peroxide liquid solution comprises diethyl phthalate.

* * * * *